Aug. 24, 1948.  A. L. BERGSTROM ET AL  2,447,838
UNIT HANDLED DOUBLE ROW ROLLER BEARING
Filed May 17, 1947  2 Sheets-Sheet 1
FIG. I.
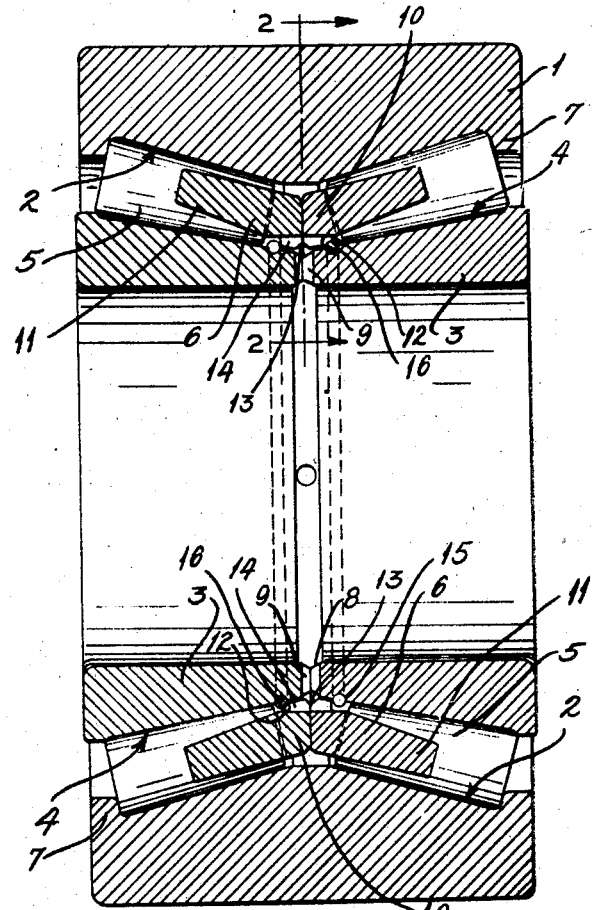
FIG. 2.
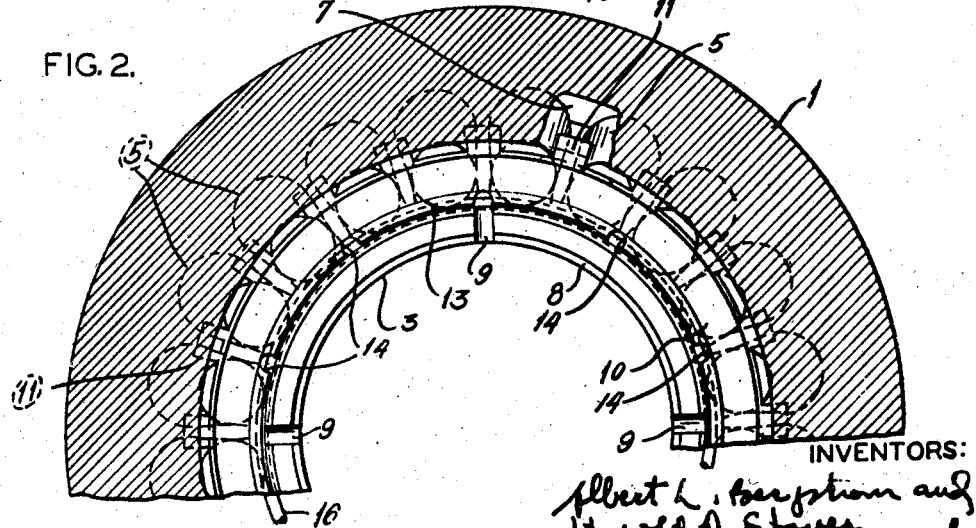
INVENTORS:
Albert L. Bergstrom and
Harold D. Stover,
by Carr, Pair & Bravely,
THEIR ATTORNEYS.

Aug. 24, 1948.    A. L. BERGSTROM ET AL    2,447,838
UNIT HANDLED DOUBLE ROW ROLLER BEARING
Filed May 17, 1947    2 Sheets-Sheet 2

INVENTORS:
Albert L. Bergstrom and
Harold O. Stover,
by Carr Van Bysandy
THEIR ATTORNEYS.

Patented Aug. 24, 1948

2,447,838

UNITED STATES PATENT OFFICE 2,447,838

UNIT HANDLED DOUBLE ROW ROLLER BEARING

Albert L. Bergstrom and Harold D. Stover, Canton, Ohio, assignors to The Timken Roller Bearing Company, Canton, Ohio, a corporation of Ohio Application May 17, 1947, Serial No. 748,766

10 Claims. (Cl. 308—214)

This invention relates to roller bearings of the type comprising two axially spaced circular series of rollers, a single outer bearing for both series of rollers and a separate inner bearing member and a separate spacing cage for the rollers of each series. The invention has for its principal object to provide a bearing of the above type that can be quickly and easily assembled and handled as a unit without the component parts becoming separated. Other objects are simplicity and cheapness of construction and compactness of design. The invention consists in the self-contained cage type double row roller bearing and in the parts, combinations and arrangements of parts hereinafter described and claimed.

Figure 3:
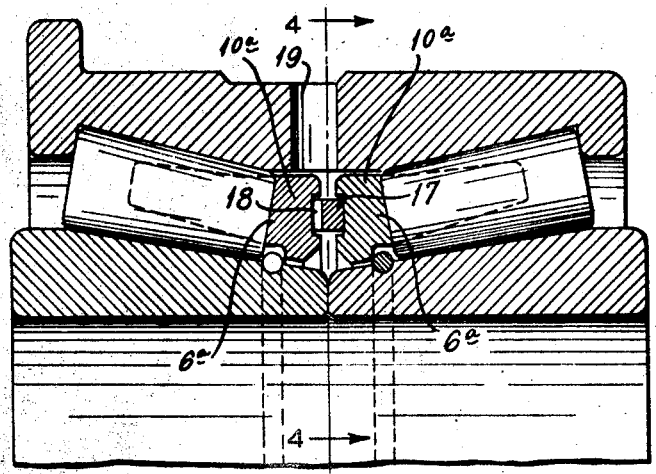
Figure 4:
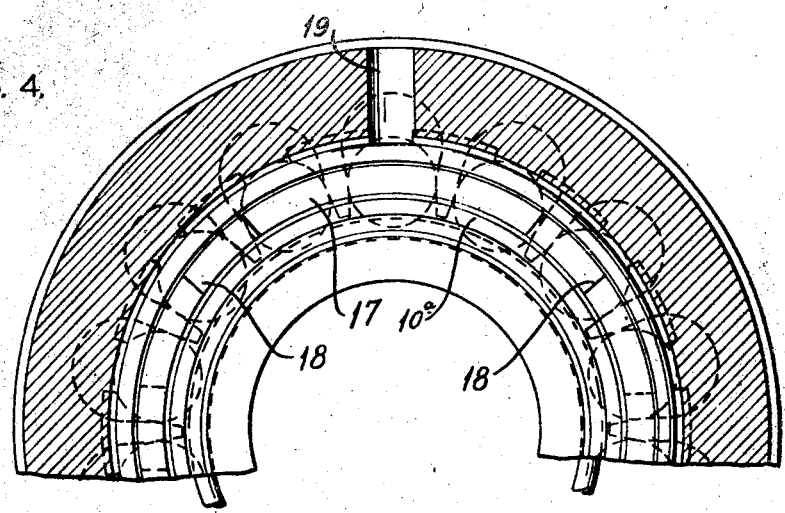
Figure 5:
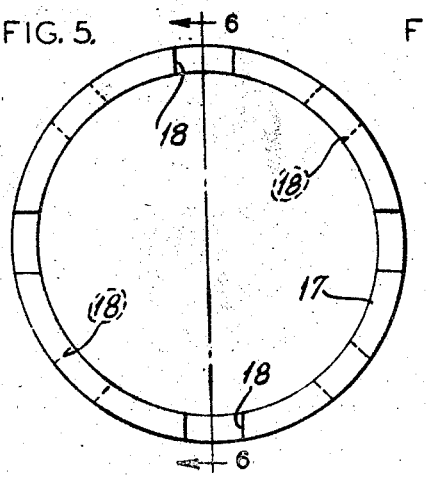
Figure 6:
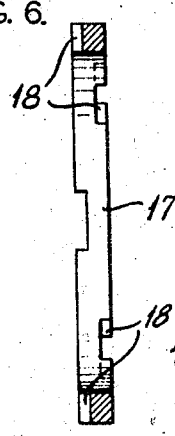

In the accompanying drawing, which forms part of this specification and wherein like symbols refer to like parts wherever they occur, Fig. 1 is a central longitudinal sectional view of a self-contained double row roller bearing embodying my invention, Fig. 2 is a fragmentary cross-sectional view on the line 2—2 in Fig. 1, Fig. 3 is a fragmentary central longitudinal sectional view illustrating a modified form of the invention, Fig. 4 is a cross-sectional view on the line 4—4 in Fig. 3, Fig. 5 is an end elevational view of the annular cage spacer member; and Fig. 6 is a sectional view on the line 6—6 in Fig. 5.

In the accompanying drawing, my invention is shown embodied in a cage type double row roller tapered roller bearing comprising a single outer bearing member or cup 1 having two axially spaced conical raceways 2 therein that taper toward the middle of the bearing, two separate cones or inner bearing members 3 having conical raceways 4 which taper towards each other, a circular series of conical rollers 5 interposed between the raceway of each inner bearing member and the corresponding raceway of the outer bearing member, and a separate spacing cage 6 for the rollers of each series.

The double cup 1 has integral internal peripheral thrust ribs 7 that are located at the large or outer ends of its raceways 2 and overlap the corresponding end of the rollers 5 cooperating therewith. The small ends of the cones 3 abut against each other and are fitted to give the cones the position required for proper running clearance between the rollers 5 and their conical raceways 2 and 4. The axial bores of the cones 3 are flared at the abutting ends thereof to provide an internal annular oil groove 8; and a plurality of radial oil grooves 9 in said abutting ends of said cones are supplied with oil from said annular oil groove.

The spacing cage 6 for each series of rollers comprises an annular body or end ring 10 disposed opposite the inner ends thereof and piloted on the inner or small end of the cone 3 therefor, and a series of circumferentially spaced arms 11 that project from the outer end of said ring in conical formation and constitute the side walls of roller receiving pockets that are open at their outer or free ends. The pocket forming arms 11 of the cage 6 have their side surfaces curved to conform to the curvature of the rollers 5; and the width of the pockets at the inner periphery of said arms is greater than the diameter of the rollers 5 so that the latter may be inserted in said pockets from the inside of said cage.

As shown in the drawing, the two cages 6 are mounted in the bearing with their end rings 10 back to back on small ends of the cones 3 and between the inner ends of the two series of rollers 5 and with their arms 11 extending outwardly therebetween. The axial bores of the end rings 10 of the cages are counterbored at their outer ends to provide internal annular recesses 12 therein; and the inner ends of said bores are flared to form an internal annular oil groove 13 adapted to receive oil from the radial oil grooves 9 in the abutting ends of the cones 3. The axial bores of the cage rings 10 are also formed with circumferentially spaced longitudinal oil grooves 14 for conveying the oil from the internal annular oil groove 13 to the interior of the bearing.

Each of the cones 3 has an external annular groove 15 formed therein between the rollers 5 and cage ring 10; and seated in said annular groove is a split snap-on retaining ring 16 that forms on said cone an external peripheral rib that overlaps the inner ends of said rollers and is accommodated in the annular recess 12 in the bore of said cage ring. The retaining rings 16 on the inner ends of the cones 3 and the thrust ribs 7 at the outer ends of the single cup 1 serve to prevent axial separation of the bearing parts in either direction, thereby permitting the entire bearing assembly to be handled as a complete self-contained unit. The retaining rings also tend to normally hold the end rings 10 of the two roller spacing cages 6 back to back and clear of the inner ends of the rollers 5.

In assembling the above described bearing, one cage 6 is placed in one end of the cup 1, one of the snap rings 16 is laid loosely in the annular recess 12 in the outer end of the axial bore of the end ring 10 of said cage and one series of rollers 3 are assembled in the pockets formed by the roller spacing arms 11 thereof. One of the cones 3 is then positioned within said series of rollers and forced axially inwardly through the snap ring 16 seated in the cage 6, thereby spreading said ring and causing it to snap into the annular groove 15 provided therefor in said cone. The second series of rollers 6, the second cage 6 and the second cone 3 are then assembled in the other end of the cup 1 in a similar manner, the end ring of the second cage resting on the end ring of the first cage during this assembling process. In operation the two cage rings 10 rub against each other but are free of the snap rings 16.

The modified bearing construction shown in Figs. 3 to 6 is similar to that shown in Figs. 1 and 2 except that in the constructions shown in Figs. 3 to 6 the end rings 10a of the two cages 6a are spaced apart axially by means of an annular spacer member 17 interposed therebetween and seating in the annular grooves 18 provided therefor in the opposing end faces of said end rings. This annular spacer member 17 has circumferentially spaced radial grooves 18 in the end faces thereof. In this construction, the bearing is lubricated from the outside through a radial hole 19 in the cup 1 and the radial grooves 18 in the spacer member 17 serve to convey the oil to the raceway surfaces of the cones 3. With this construction, after the first cage, snap ring, rollers and cone have been mounted in one end of the cup, the second cage is inserted in the other end of said cup with the annular spacer member 17 interposed between the two cages and seated in the annular grooves in the opposing ends thereof, after which the second snap ring, rollers and cone are inserted in the order named.

What we claim is:

1. A double row roller bearing comprising two axially spaced circular series of rollers, a single outer bearing member for both series of rollers, two inner bearing members, one for each series of rollers, and two spacing cages, one for the rollers of each series, said spacing cages comprising annular members interposed between the two series of rollers and each having spacing arms extending between adjacent rollers, said outer bearing member having internal peripheral ribs overlapping the outer ends of both series of rollers, and each of said inner bearing members having an external peripheral rib overlapping the inner ends of the rollers cooperating therewith, the whole forming a self-contained unit assembly.

2. A double row taper roller bearing comprising two axially spaced circular series of rollers, a single outer bearing member for both series of rollers, two inner bearing members, one for each series of rollers, and two spacing cages, one for the rollers of each series, said spacing cages comprising annular end members interposed between the two series of rollers and each having spacing arms extending between adjacent rollers, said outer bearing member having integral internal peripheral thrust ribs overlapping the outer ends of said series of rollers, and each of said inner bearing members having an external peripheral retaining rib overlapping the inner ends of the rollers cooperating therewith, the whole forming a self-contained unit assembly.

3. A double row taper roller bearing comprising two axially spaced circular series of rollers, a single outer bearing member for both series of rollers, two inner bearing members, one for each series of rollers, two spacing cages, one for the rollers of each series, said spacing cages comprising annular end members, interposed between the inner ends of the two series of rollers and each having spacing arms extending between adjacent rollers, said outer bearing member having integral internal peripheral end thrust ribs overlapping the outer ends of said series of rollers, and a retaining ring mounted on each of said inner bearing members in overlapping relation to the inner ends of the rollers cooperating therewith, the whole forming a self-contained unit assembly.

4. A double row taper roller bearing comprising two axially spaced circular series of rollers, a single outer bearing member for both series of rollers, two inner bearing members, one for each series of rollers, and two spacing cages, one for the rollers of each series, said spacing cages comprising annular end members disposed back to back between the two series of rollers and having spacing arms extending from their remote end faces between adjacent rollers, said outer bearing member having integral internal peripheral ribs overlapping the outer ends of said series of rollers, and each of said inner bearing members having an external peripheral retaining rib interposed between the inner ends of the rollers cooperating therewith and the annular end member of the cage for said last mentioned rollers, the whole forming a self-contained unit assembly.

5. A double row taper roller bearing comprising two axially spaced circular series of rollers, a single outer bearing member for both series of rollers, two inner bearing members, one for each series of rollers, two spacing cages, one for the rollers of each series, said spacing cages comprising annular end members disposed back to back between the two series of rollers and having spacing arms extending from their remote end faces between adjacent rollers, said outer bearing member having integral internal peripheral ribs overlapping the outer ends of said series of rollers, and each of said inner bearing members having an external annular groove therein, and a split retaining ring seated in the annular groove of each of said inner bearing members in overlapping relation to the inner ends of the series of rollers cooperating therewith, the whole forming a self-contained unit assembly.

6. A double row taper roller bearing comprising two axially spaced circular series of rollers, a single outer bearing member for both series of rollers, two inner bearing members, one for each series of rollers, two spacing cages, one for the rollers of each series, said spacing cages comprising annular end members disposed back to back between the two series of rollers and having spacing arms extending from their remote end faces between adjacent rollers, said outer bearing member having integral internal peripheral ribs overlapping the outer ends of said series of rollers, and each of said inner bearing members having an external annular groove therein, and a split retaining ring seated in the annular groove of each of said inner bearing members in overlapping relation to the inner ends of the series of rollers cooperating therewith and the annular end member of the cage for said last mentioned series of rollers, the whole forming a self-contained unit assembly.

7. A double row taper roller bearing comprising two axially spaced circular series of rollers, a single outer bearing member for both series of rollers, two inner bearing members, one for each series of rollers, two spacing cages, one for the rollers of each series, said spacing cages comprising annular end members piloted on the inner bearing members between the two series of rollers and having spacing arms extending from their remote end faces between adjacent rollers, said outer bearing member having integral internal peripheral ribs overlapping the outer ends of said series of rollers, and each of said inner bearing members having an external annular groove therein, and a split retaining ring seated in the annular groove of each of said inner bearing members in overlapping relation to the inner ends of the series of rollers cooperating therewith, the outer end of each of said annular end members being counterbored to accommodate the retaining ring adjacent thereto, the whole forming a self-contained unit assembly.

8. The combination set forth in claim 7 wherein the inner ends of said inner bearing members have radial oil grooves therein, the annular end members are disposed back to back and are shaped to form an internal annular oil groove therein at their adjacent end faces and are formed with internal longitudinal oil grooves communicating with said annular oil groove.

9. A double row taper roller bearing comprising two axially spaced circular series of rollers, a single outer bearing member for both series of rollers, two inner bearing members, one for each series of rollers, two spacing cages, one for the rollers of each series, said spacing cages comprising annular end members piloted in said outer bearing member between the two series of rollers thereon and having spacing arms extending from their remote end faces between adjacent rollers, said outer bearing member having integral internal peripheral ribs overlapping the outer ends of said series of rollers, and each of said inner bearing members having an external peripheral retaining rib interposed between the inner ends of the rollers cooperating therewith and the annular end member of the cage for said last mentioned rollers, and an annular spacer member interposed between said annular end members, the whole forming a self-contained unit assembly.

10. The combination set forth in claim 9 wherein the opposing end faces of said annular end members have annular grooves therein for supporting said annular spacer member and the latter has radial oil grooves in its opposite end faces.

ALBERT L. BERGSTROM.
HAROLD D. STOVER.